United States Patent
Oudet

(10) Patent No.: US 6,851,001 B1
(45) Date of Patent: Feb. 1, 2005

(54) ADDRESS REMAPPING FOR A BUS

(75) Inventor: Pascal Oudet, Brinoud (FR)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 09/247,795

(22) Filed: Feb. 8, 1999

(30) Foreign Application Priority Data

Mar. 27, 1998 (EP) .............................. 98400760

(51) Int. Cl.[7] .............................................. G06F 13/00
(52) U.S. Cl. ........................ 710/104; 710/9; 710/315
(58) Field of Search ................................ 710/104, 9, 3, 710/28, 305, 306, 314, 315; 711/200, 202; 370/399, 402, 408, 401; 709/245

(56) References Cited

U.S. PATENT DOCUMENTS

| | | | |
|---|---|---|---|
| 3,940,743 A | | 2/1976 | Fitzgerald |
| 4,689,740 A | | 8/1987 | Moelands et al. |
| 4,933,938 A | * | 6/1990 | Sheehy ...................... 370/401 |
| 5,408,228 A | | 4/1995 | Wnendt et al. |
| 5,636,216 A | * | 6/1997 | Fox et al. ................... 370/402 |
| 5,664,221 A | * | 9/1997 | Amberg et al. ................ 710/9 |
| 5,715,419 A | * | 2/1998 | Szczepanek et al. ......... 711/212 |
| 5,740,464 A | * | 4/1998 | Priem et al. .................... 710/3 |
| 5,809,330 A | * | 9/1998 | Ninomiya ....................... 710/9 |
| 5,835,738 A | * | 11/1998 | Blackledge, Jr. et al. ... 710/127 |
| 5,884,027 A | * | 3/1999 | Garbus et al. .............. 709/250 |
| 5,911,042 A | * | 6/1999 | Kugue ......................... 713/202 |
| 6,006,272 A | * | 12/1999 | Aravamudan et al. ...... 709/245 |
| 6,044,411 A | * | 3/2000 | Berglund et al. ............... 710/9 |
| 6,069,890 A | * | 5/2000 | White et al. ................ 370/352 |
| 6,105,077 A | * | 8/2000 | Kimura ......................... 710/9 |
| 6,195,734 B1 | * | 2/2001 | Porterfield .................. 711/203 |
| 6,480,508 B1 | * | 11/2002 | Mwikalo et al. ............ 370/475 |

FOREIGN PATENT DOCUMENTS

EP     0 156 542     10/1985

OTHER PUBLICATIONS

"The I[2]C Bus and How to Use It (including specifications)," *Philips Semiconductors*, Apr. 1995.

* cited by examiner

Primary Examiner—Hien Vu
Assistant Examiner—X. Chung-Trans

(57) ABSTRACT

The invention relates to an address remapper for a two wire serial bus. This remapper connects two sections of the bus, and is generally transparent, except when it receives an address; in this case, the remapper changes the address before transmitting it to the other section of the bus. This allows using stations having the same physical address on the same bus, and allows a greater number of stations to be used on the bus larger than that allowed under an address format with a fixed part.

18 Claims, 2 Drawing Sheets

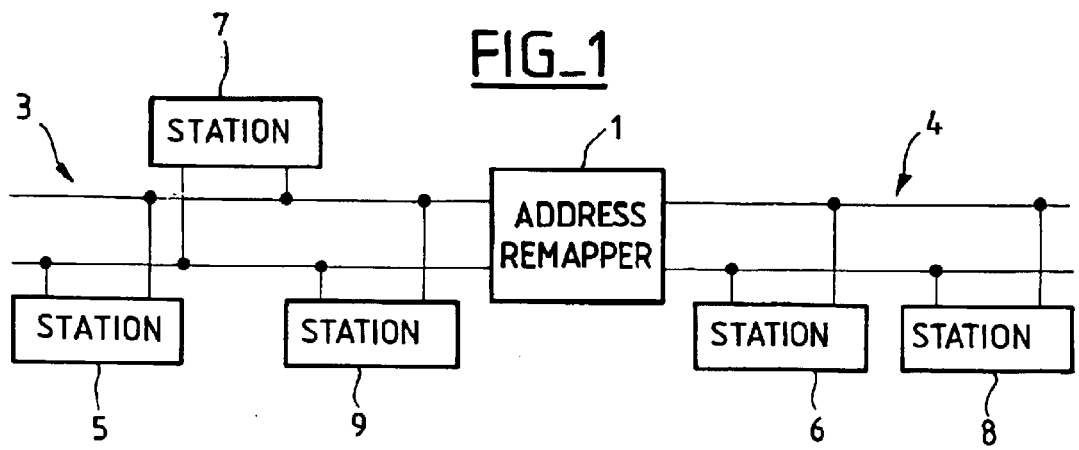
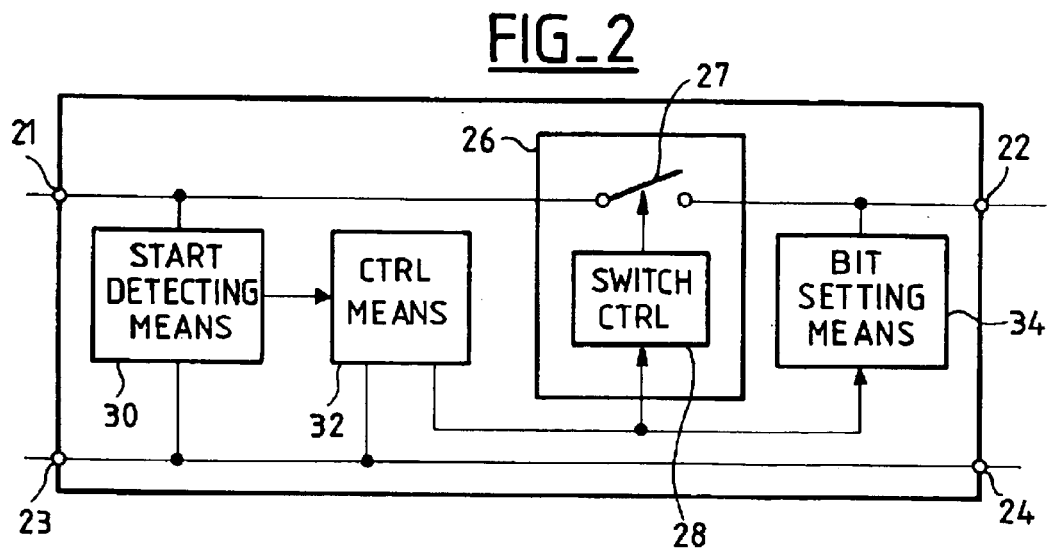
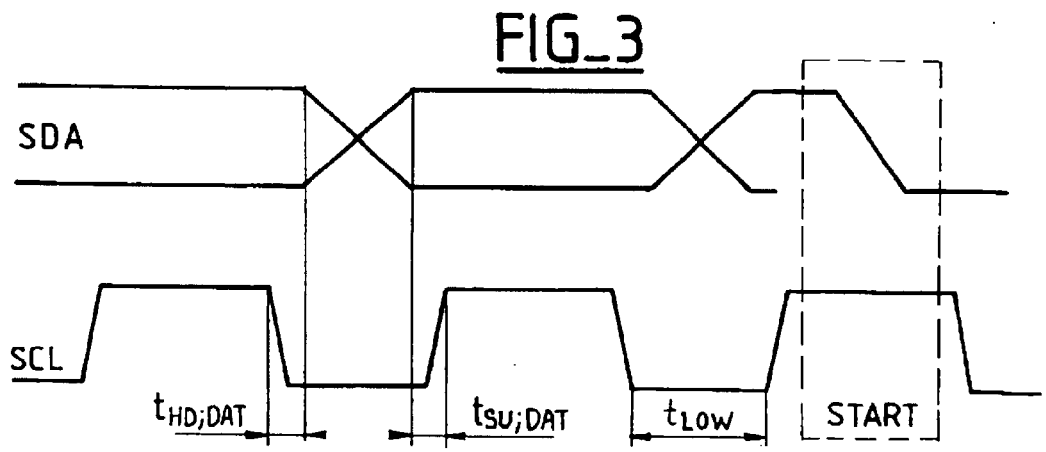

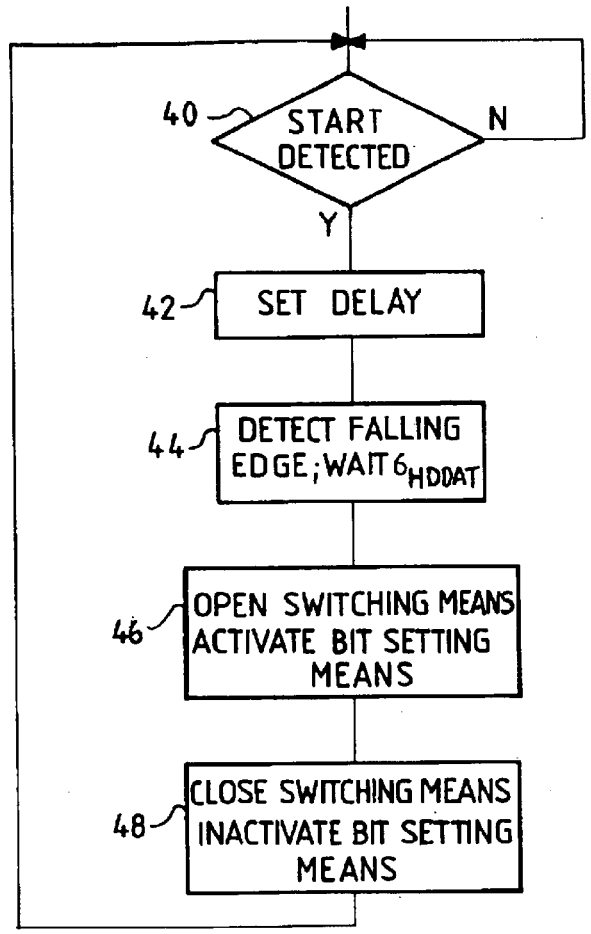
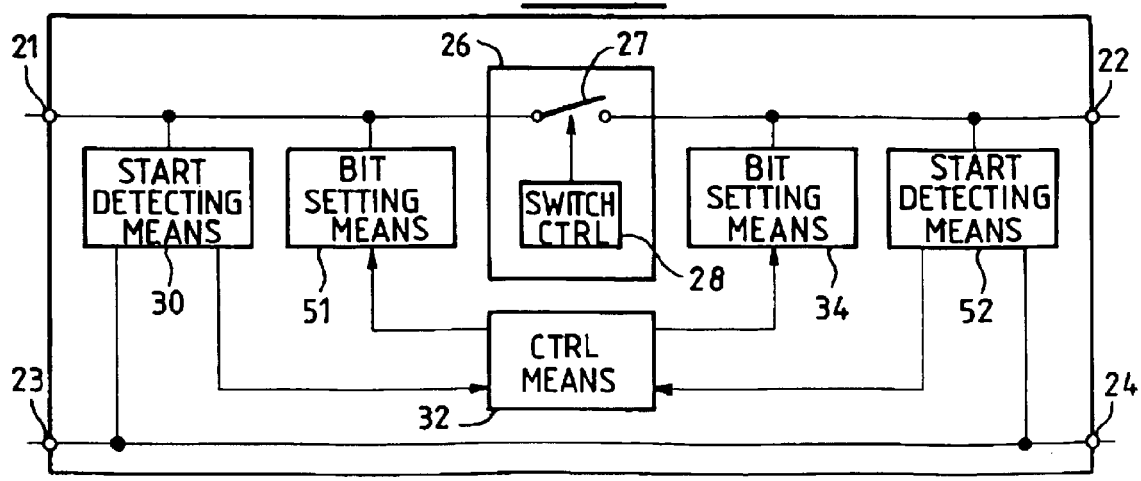

ADDRESS REMAPPING FOR A BUS

FIELD OF THE INVENTION

The present invention relates to a bus, having at least an address remapper defining two sections in the bus. It also relates to an address remapper for such a bus, and to a process for connecting two sections of a bus. It applies particularly to two-wire serial buses.

BACKGROUND OF THE INVENTION

A bus is comprised of an assembly of wires intended to transfer information between stations connected on the bus.

U.S. Pat. No. 4,689,740 discloses a two wire serial bus system, comprising a clock wire and a data wire, for interconnecting a number of stations. The system disclosed in this specification is promoted by Philips Semiconductors under the name I2C bus. The number of stations connected to this bus system is limited by the size of the address of the stations. A similar two wire serial bus system is also sold under the reference SMBus (system management bus) by Intel. In the rest of the present specification, the terms I2C will be used as a generic term for such two wire serial bus systems.

This bus system comprises two wires, that is a data wire and a clock wire. The data wire is normally at a high level and may be brought to a low level by any station connected to the bus. START and STOP conditions are defined as a transition of the value of the data wire while the clock wire is at a high level; a START condition is followed by an address. For more details on the structure and operation of the I2C bus system, reference should be made to the document 'The I2C bus and how to use it (including specifications)' Philips Semiconductors, April 1995.

One problem in I2C buses is the use of similar stations. Generally such stations are provided as ICs having an address comprised of a fixed part and of a setable part; the setable part of the address can be set by the user of the IC, at the time the station is used.

Such addresses further limit the number of identical stations used on the same I2C bus. For instance, for an address mapped on 8 bits, with the last bit used for indicating the read-write direction, four bits of the address may be fixed by the founder of the IC, thus leaving only 3 bits of address setable by the user. Under such circumstances, it is not possible to have more than 8 similar stations on the same bus. In existing serial eeproms on the market, the address format is 1010xyzR (binary format), where x, y and z are configurable by the user; a maximum of 8 eeproms is thus allowed on the bus.

Another problem with an I2C bus is that it is impossible on such a bus to have two distinct stations having the same physical address. This prevents using the same chip twice.

Accordingly, the address scheme of I2C is a limitation to the use of similar or identical stations on the bus system. There exists a need for a solution allowing the use of similar or identical stations on an I2C type bus, or on similar types of two wire buses, or more generally on all types of buses.

SUMMARY OF THE INVENTION

According to the invention, there is provided a bus, having at least an address remapper defining two sections in the bus, each section comprising at least one station having a physical address, wherein a station on one section of the bus is assigned a dummy address for being addressed by a station on the other section, the address remapper remapping a dummy address from the other section into a physical address to the one section.

In one embodiment, the format of a physical address comprises a fixed part and a setable part, and the dummy address is obtained by changing at least one bit of the fixed part of the physical address.

In this case, the dummy addresses for stations out of a given section are preferably different from the physical addresses for stations in said given section.

According to the invention, there is also provided an address remapper for a bus, comprising terminals for connecting two sections of the bus;

address detecting means for detecting an address received from one section of the bus;

address remapping means for remapping the address and transmitting the remapped address to the other section of the bus.

Preferably, the bus is a two wire serial bus, and the address detecting means detect a transition of the value on one wire while the other wire is at a given level.

In another embodiment, the bus is a two wire serial bus, and the address remapping means comprise means for bringing one wire to a given level.

The bus may also be a two wire serial bus having one data wire and one clock wire, the terminals for the clock wire of each section being connected. In this case, the address remapping means may comprise switching means for selectively connecting the terminals for the data wire of each section.

Finally, there is provided a process for connecting two sections of a bus, by transmitting data from one section of the bus to the other section of the bus, comprising the steps of detecting an address sent from one section of the bus to the other section of the bus;

remapping the address before transmitting it to the other section of the bus.

Preferably, the step of detecting comprises detecting a START condition preceding an address.

The step of remapping may comprise changing at least one bit of an address, preferably one bit of a fixed part of an address.

BRIEF DESCRIPTION OF THE INVENTION

A bus system embodying the invention will now be described, by way of non-limiting example, with reference to the accompanying drawings, in which FIG. 1 is a schematic drawing of a bus system according to the invention;

FIG. 2 is a schematic diagram of an address remapper according to the invention;

FIG. 3 shows the timing of signals in a two wire serial bus;

FIG. 4 is a flowchart of the operation of the address remapper of FIG. 2;

FIG. 5 is a schematic drawing of an address remapper according to another embodiment of the invention.

BEST MODE OF CARRYING OUT THE INVENTION

The invention is directed to overcoming the problems of the prior art as regards the addressing of the stations in a bus. It is exemplified in the rest of the present description as regards a two wire serial bus system having a data wire and a clock wire. The basic operation of such a bus system is based on the definition of STOP and START conditions, that correspond to a given change on the data line while the clock line is at a high level. The invention is however not limited to such a bus system, but applies to all kind of buses.

The invention suggests using an address remapper for defining different sections in the bus, and remapping the address in each section. FIG. 1 is a schematic drawing of a bus system according to the invention, in the simplest configuration where the bus comprises one address remapper 1 defining two sections on the serial bus: the first section 3 is on one side of the address remapper—the left side on FIG. 1, and the other section 5 is on the other side of the address remapper—the right side on FIG. 1. On each section 3, 4 of the bus, there may be several stations, and by way of example, the bus system of FIG. 1 comprises three stations 5, 7 and 9 on the left side and two stations 6 and 8 on the right side. For instance, assuming the address format of each station is 1010xyzR, as in the existing eeproms stations, table I gives a possible set of addresses for the stations:

TABLE I

| station | address |
| --- | --- |
| 5 | 1010001 |
| 7 | 1010010 |
| 9 | 1010011 |
| 6 | 1010001 |
| 8 | 1010010 |

Addresses in table I are the physical addresses of each station, that is the address configured in each station according to the existing I2C specification. In other words, a message sent on the left section of the bus, with an address 1010001 will be considered and processed by station 5, and ignored by stations 7 and 9. As exemplified in this table, station 5 on the left section of the bus and station 6 on the right section of the bus have the same physical address 1010001, while station 7 on the left section of the bus and station 8 on the right section of the bus have the same physical address 1010010. It is clear that such stations cannot possibly be used on the same two wire serial bus according to the prior art.

The operation of the bus of FIG. 1 is the following. In each section of the bus, the operation is the same one as in the prior art bus. Thus, existing eeproms may also be used for the stations in a bus according to the invention. However, according to the invention, the physical address of the stations of each section is remapped into dummy addresses for the stations of the other sections. Thus, one station on one section of the bus according to the invention sees the stations on the same section with their physical addresses—and thus sees itself with its physical address; however, one station on one section of the bus according to the invention sees the stations on other sections of the bus with dummy addresses that differ from their physical address. The address remapper, when passing a message on the bus from one section to another, will change the dummy address into a physical address.

In the example of FIG. 1, the following scheme is used for the dummy addresses. Table II gives the addresses of stations on the right section of the bus, as they are sent or received by a station on the left section of the bus.

TABLE II

| station | address |
| --- | --- |
| 6 | 1011001 |
| 8 | 1011010 |

This means that a station on the section left of the address remapper—say station 5—will address the other stations on the same section (or receive messages from these other stations) using their respective physical addresses—1010010 and 1010011 for stations 7 and 9; on the other hand, it will address stations on the other section using their dummy address—1011001 and 1011010 for stations 6 and 8.

Similarly, Table III gives the addresses of the stations on the left section of the bus, as they are sent and received by a station on the right section of the bus.

TABLE III

| station | address |
| --- | --- |
| 5 | 1011001 |
| 7 | 1011010 |
| 9 | 1011011 |

This means that a station on the section 4 right of the address remapper—say station 6 will address the other station 8 on the same section (or receive messages from this other station) using its physical addresses 1010010; on the other hand, it will address stations 5, 7 and 9 on the other section using their dummy address—1011001, 1011010 and 1011011.

When a message is sent from the station 6 on the right section 4 to the station 5 on the left section 3, the message is sent with an address 1011001, that corresponds to the dummy address of station 5 for station 6. When the message is passed from the right section 4 to the left section 3, the address remapper changes the address into 1010001, so that the message on the left section is actually received by station 5. Similarly, when a message is sent from the station 7 on the left section 3 to the station 8 on the right section 4, the message is sent with an address 1011010, that corresponds to the dummy address of station 8 for station 7. When the message is passed from the left section 3 to the right section 4, the address remapper changes the address into 1010010, so that the message on the right section is actually received by station 8. In each case, the bits other than the address bits are left unchanged by the address remapper, so that the message is passed normally. Thus, the operation of the invention is transparent for each station, and the only constraint is the use of a different mapping of the stations on each section; this is easily obtained when programming each station. The invention thus permits using, on the same I2C bus, stations having the same address, or a number of stations larger than the configurable addresses of a given type of eeprom.

The operation of the invention was explained in reference to FIG. 1 in the case of one single remapper; in addition, the remapping of the addresses in FIG. 1 was simply done by changing one address bit. The invention is not limited to one address remapper, nor is it limited to this type of address remapping. More generally, a bus according to the invention may comprise more than one address remapper: each address remapper actually defines two sections—that is, one existing bus or bus section may be divided into two sections by an address remapper. The bus may thus comprise two remappers and three section, or n remappers and n+1 sections. The number of address remappers may be chosen according to the number of stations and to the address format: For instance, where stations with identical addresses are to be used on the bus, the number of sections would be at least equal to the number of such stations, each section containing one of the stations having identical addresses. Otherwise, where the address has a fixed part and a configurable part, the number of sections may be chosen so that each section contains at most as many stations as the number of configurable addresses.

The address remapping scheme may simply be carried out as explained above, by changing the bits of the fixed part of the address; this solution is the simplest one to carry out where the address format of the stations comprises a fixed part. However, other remapping schemes are possible, even where the address format of the stations does not comprise a fixed part. It is in both cases sufficient that the dummy addresses for the stations out of a given section are different from the physical addresses of the stations in that given section. Changing at least one bit is a simple solution that fulfils this criterion.

Table IV gives the example of a bus system comprised of three sections, that is two address remappers; each section comprises three stations, having the physical addresses 1010001 and 1010010. The three sections are noted A1, A2 and A3, whereas the nine stations are noted S1 to S9. The columns of table IV give a possible remapping for each station.

TABLE IV

| Station | Section A1 | Section A2 | Section A3 |
|---------|-----------|-----------|-----------|
| S1 | 1010001 | 1011001 | 1001001 |
| S2 | 1010010 | 1011010 | 1001010 |
| S3 | 1010011 | 1011011 | 1001011 |
| S4 | 1011001 | 1010001 | 1000001 |
| S5 | 1011010 | 1010010 | 1000010 |
| S6 | 1011011 | 1010011 | 1000011 |
| S7 | 1001001 | 1000001 | 1010001 |
| S8 | 1001010 | 1000010 | 1010010 |
| S9 | 1001011 | 1000011 | 1010011 |

In this example, the address remapper between sections A1 and A2 changes the value of the fourth bit of any address it receives. The address remapper between sections A2 and A3 changes the value of the third bit of any address it receives. The invention thus makes it possible to have on the same bus nine stations, that is more than the number of possible addresses using an address format of the type 1010xyzR. It also make it possible to have on the same bus several stations having the same physical address, e. g. S1, S4 and S7 in Table IV.

FIG. 2 is a schematic diagram of an address remapper according to the invention; the address remapper of the invention is preferably able to change the address it receives on one section into addresses remapped for another section. Preferably, the remapper of FIG. 2 is able to change or remap the address in a manner transparent to the station, that is without inducing any significant delay in the transmission of messages. Such a real time transmission ensures that the different sections of the bus will remain synchronised, so that the operation of the invention is transparent for the stations. In addition, this ensures that the time out period, in case there is one, does not lapse: under I2C existing specifications, there is no time out, however, there is a time out of 25 ms in the SMBus specifications. This also allows several remappers to be cascaded along the bus.

The address 20 remapper of FIG. 2 is designed for transfer of master to slave messages in one direction only, in the example of FIG. 2, from the left to the right; responses from slaves may be transferred in the other direction. In other words, the remapper of FIG. 2 is designed to be used with all stations that can possibly act as masters on the left side of the remapper. Such a configuration may prove useful for instance where the I2C bus is used for hardware management purposes, and where some stations need only be addressed as slave stations; thus, they may be wired on a bus section containing only slave stations, while the other bus section will contain stations acting as slave or master.

The remapper comprises left data and clock terminals 21 and 23, and right data and clock terminals 22 and 24; respective sections of the bus may be connected to the left and right terminals. The left and right clock terminals 23 and 24 are connected, so that the clock wire along the different bus sections is continuous; this ensures synchronism of the different bus sections. The left and right data terminals 21 and 22 are connected via switching means 26; the switching means are able to connect or disconnect the left and right data terminals, and mainly comprise a switch 27 and a switch command 28. The remapper of FIG. 2 further comprises START detecting means 30 connected between the left data and clock terminals 21 and 23, for detecting the occurrence of a START condition on the section of the bus connected to the left data and clock terminals. The START detecting means 30 output a signal representative of the occurrence of a START condition to control means 32. The remapper of FIG. 2 further comprises bit setting means 34 connected to the right data terminal 22, for setting the value of a bit on a data wire connected to the right data terminal. The control means 32 control the operation of the switching means 26 and of the setting means 34 as explained below; the control means are also connected to the clock line. The control means, the switching means and the bit setting means form address remapping means for remapping the address received on the left terminals and transmitting the remapped address to the right terminals.

The different elements of the remapper of FIG. 2 may easily be realised by the person skilled in the art, with the same type of components used for I2C stations; inter alia, the START detecting means and the bit setting means are usual components of any station for I2C buses; for instance, the bit setting means may be formed of pull-down means for setting the value of a bit to 0, the pull-down being inactivated when the bit value is 1.

FIG. 3 shows the timing of signals in a two wire serial bus; change of data on the data wire SDA is allowed in the low period $t_{low}$ of the clock wire SCL. $t_{HD;DAT}$ is the data hold time between the falling edge of a clock pulse and the beginning of the change of data on the data wire; this period is specified under I2C and may be zero; $t_{SU;DAT}$ is the data set-up time between the setting up of the data on the data wire and the leading edge of the following clock pulse. A START condition is detected when the data signal goes down during the high period $t_{high}$ of the clock signal.

FIG. 4 is a flowchart of the operation of the address remapper of FIG. 2; the operation is described in reference to the example of FIG. 2, whereby the address remapper changes the value of the fourth bit of each address it receives.

At step 40, the control means 32 check whether a START condition was detected, that is whether the START detecting means output a signal representative of the detection of a START condition. At that time, the switching means are closed, so that the data wires connected to the left and right data terminals are connected. Thus, the START condition may be output by any station on any section of the bus. If no START condition is detected, the process stays at step 40. If a START condition is detected, the process passes to step 42.

At step 42, the control unit sets a delay of three clock periods. At the end of these three clock periods, the process passes to step 44. This delay corresponds to the operation of the remapper, where the first three bits of the address are not changed. While the process is at step 42, the switch means remain closed, so that the first three bits of the address are not changed by the remapper.

At step 44, the falling edge of the clock signal is detected; at that time, the third address bit has just passed; if this is necessary, a delay of $t_{HD;DAT}$ is set. The process then passes to step 46.

At step 46, the value of the fourth bit of the address is changed. For this, the switching means are opened, so that the data wire on the two section of the bus connected to each side of the remapper are isolated; at the same time, the control means 32 output a control signal to the bit setting means, that is opposite to the signal received on the left data terminal. Thus, the bit value on the right data terminal is set to the value opposite the bit value on the left data terminal, with a delay corresponding to the propagation time through the control means; the value of such a delay is far less than the data set-up time, so that the setting of the value on the right data terminal occurs in due time. The process then passes to step 48.

At step 48, the falling edge of the clock signal is detected; if necessary, a delay of $T_{HD;DAT}$ is set, and the switch means are then closed, while the bit setting means are inactivated. The process then passes again to step 40.

The flowchart of FIG. 4 may be adapted to change more than one bit, or to change another bit than the fourth one. The operation is in any case similar, the switch means being opened and the bit setting means being activated whenever a bit need to be changed.

FIG. 5 is a schematic drawing of an address remapper according to the invention, that may be used for bidirectional transfer. The remapper of FIG. 5 is similar to the one of FIG. 2; it however further comprises left bit setting means 51 connected to the left data terminal 21, for setting the value of a bit on a data wire connected to the left data terminal; it also comprises right start detecting means 52 connected to the right data and clock terminals for detecting a START condition on the section of the bus connected to the right terminals. In addition, the control means receive the signal from the right data terminal. Thus, the address remapper comprises:

right and left bit setting means 34 and 51;
right and left start detecting means 52 and 30.

The operation of the remapper of FIG. 5 is the following. When a START condition is detected on one section of the bus, the remapper remaps the address received from this section of the bus. For instance, if a START condition is received on the section of the bus connected to the right terminals, the right bit setting means are inactivated, and the address received from the right side is remapped to the left side by the left bit setting means, in a way similar to the operation of the remapper of FIG. 2.

Thus, the remapper of FIG. 5 allows remapping on sections of the bus on both sides of the remapper; it may be used where there are masters on both sides of the remapper.

The operation of the remapper of FIG. 2 is based on the fact that any address sent on the bus immediately follows a START condition; in case of a different protocol, the START detecting means could be changed so as to detect the fact that an address is going to be sent on the bus: the START detecting means of FIGS. 2 and 4 thus actually constitute address detecting means for the I2C bus. More generally, the operation of the remapper may be adapted to the communication protocol used on the bus; for instance, it is not necessary that the START detecting means try to detect a START when there cannot be one, e.g. during data transfer: under such circumstances, the START detecting means could be inactivated, and could be reactivated only when a START is possible.

It should be understood that the invention is not limited to the example of a serial bus discussed above. The invention also applies to different types of serial buses, and also to parallel buses. In the case of a parallel bus, remapping one bit of an address simply involves changing the level on one wire of the parallel bus, when the address is actually being applied on the bus. The address detecting means are thus preferably adapted for detecting the conditions under which the address is applied on the bus.

In addition, the invention is not limited to the binary values used in the I2C bus. In other words, the address remapping means could bring one wire or more to the high level. A start condition could be associated with a transition on one wire while the other one is at a low level.

What is claimed is:

1. A bus, having at least an address remapper defining two sections in the bus, each section comprising at least one station having a physical address, wherein stations on each section of the bus are each assigned a dummy address for being addressed by a station on the other section, the address remapper remapping a dummy address from one section into a physical address to the other section.

2. A bus according to claim 1, wherein the format of a physical address comprises a fixed part and a setable part, and wherein the dummy address is obtained by changing at least one bit of the fixed part of the physical address.

3. A bus according to claim 1, wherein the dummy addresses for stations out of a given section are different from the physical addresses for stations in said given section.

4. An address remapper for a bus, comprising:
   terminals for connecting two sections of the bus;
   address detecting means for detecting an address received from one section of the bus;
   address remapping means for remapping the address and transmitting the remapped address to the other section of the bus.

5. An address remapper according to claim 4, wherein the bus is a two wire serial bus, and wherein the address detecting means detect a transition of the value on one wire while the other wire is a given level.

6. An address remapper according to claim 4, wherein the bus is a two wire serial bus, and wherein the address remapping means comprise means for bringing one wire to a given level.

7. An address remapper according to claim 4, wherein the bus is a two wire serial bus having one data wire and one clock wire, the terminals for the clock wire of each section being connected.

8. An address remapper according to claim 7, wherein the address remapping means includes switching means for selectively disconnecting the bus during the remapping operation.

9. A process for connecting two sections of a bus, by transmitting data from one section of the bus to the other section of the bus, comprising the steps of
   detecting an address sent from one section of the bus to the other section of the bus;
   remapping the address before transmitting it to the other section of the bus.

10. A process according to claim 9, wherein the step of detecting comprises detecting a START condition preceding an address.

11. A process according to claim 10, wherein the step of remapping comprises changing at least one bit of an address, preferably one bit of a fixed part of an address.

12. A computer system including a bus, having at least an address remapper defining two sections in the bus, each section comprising at least one station having a physical address, wherein a station on one section of the bus is assigned a dummy address for being addressed by a station on the other section, the address remapper remapping a dummy address from the other section into a physical address to the one section.

13. A computer system according to claim 12, wherein the format of a physical address comprises a fixed part and a setable part, and wherein the dummy address is obtained by changing at least one bit of the fixed part of the physical address.

14. A computer system according to claim 12, wherein the dummy addresses for stations out of a given section are different from the physical addresses for stations in said given section.

15. A bus having at least an address remapper defining at least two sections of the bus, each section of the bus having at least one station having a physical address and wherein each station in each section of the bus is assigned a dummy address for use when being addressed by a station on the other bus section, the address remapper remapping dummy addresses on either section of the bus into a corresponding physical address on the other section of the bus.

16. The bus of claim 15 wherein a station on one portion of the bus and another station on the other portion of the bus share a common physical address.

17. A bus as claimed in claim 15 wherein the address remapping is performed by changing at least one bit of the address of each station.

18. A bus, having at least an address remapper defining two sections in the bus, each section including at least one station having a physical address, wherein each station on each section of the bus is assigned a dummy address by the remapper for the purpose of being addressed by a station on the other section, the address remapper transparently remapping each dummy address from one section into a physical address on the other section.

* * * * *